United States Patent [19]
Aoki

[11] Patent Number: 6,108,780
[45] Date of Patent: Aug. 22, 2000

[54] OPERATING SYSTEM STARTUP APPARATUS, METHOD FOR OPERATING SYSTEM STARTUP AND A MECHANICALLY READABLE STORAGE MEDIUM CONTAINING A PROGRAM THEREFOR

[75] Inventor: Shuichiro Aoki, Tokyo, Japan

[73] Assignee: NEC Corporation, Tokyo, Japan

[21] Appl. No.: 09/144,505

[22] Filed: Aug. 31, 1998

[30] Foreign Application Priority Data

Aug. 30, 1997 [JP] Japan .................................... 9-249713

[51] Int. Cl.[7] ........................ G06F 15/177; G06F 15/167
[52] U.S. Cl. ................................... 713/2; 709/216; 713/1
[58] Field of Search .................................. 713/1, 2, 100; 709/216, 212; 395/712

[56] References Cited

U.S. PATENT DOCUMENTS

| | | | | |
|---|---|---|---|---|
| 5,469,573 | 11/1995 | McGill | ..................................... | 395/700 |
| 5,717,930 | 2/1998 | Imai et al. | .............................. | 395/712 |
| 5,887,164 | 3/1999 | Gupta | ...................................... | 395/652 |
| 5,892,952 | 4/1999 | Seko | ........................................ | 395/712 |
| 5,978,590 | 11/1999 | Imai | ......................................... | 395/712 |

FOREIGN PATENT DOCUMENTS

| | | |
|---|---|---|
| 62-248019 | 10/1987 | Japan . |
| 64-67620 | 3/1989 | Japan . |
| 4-367948 | 12/1992 | Japan . |
| 5-40636 | 2/1993 | Japan . |
| 6-51989 | 2/1994 | Japan . |
| 6-51990 | 2/1994 | Japan . |
| 8-263368 | 10/1996 | Japan . |

Primary Examiner—Joseph E. Palys
Assistant Examiner—Ronald D Hartman, Jr.
Attorney, Agent, or Firm—Foley & Lardner

[57] ABSTRACT

When installing an operating system into a system-resident volume, the operating system boot path information and identifier are written into a backup memory and the system-resident volume. When booting of an operating system is instructed in the case in which the operating system has been installed on the system-resident volume of another computer, if a referencing means judges that the operating system boot path information and identifier have not been stored in the backup memory, a booting means causes the contents of the backup memory to coincide with the boot path information and the identifier that are stored in the system-resident volume, and then boots the operating system.

6 Claims, 7 Drawing Sheets

Fig. 6

3 : DISPLAY APPARATUS

"An operating system is not installed on this disk."

Fig. 7

3 : DISPLAY APPARATUS

"Boot path information and identifier are different.

Boot anyway? Y/N"

OPERATING SYSTEM STARTUP APPARATUS, METHOD FOR OPERATING SYSTEM STARTUP AND A MECHANICALLY READABLE STORAGE MEDIUM CONTAINING A PROGRAM THEREFOR

BACKGROUND OF THE INVENTION

1. Field of the Invention

The present invention relates to an operating system startup apparatus, and more specifically to a technology for reliably starting an operating system when exchange is performed of a system-resident volume.

2. Description of Related Art

When replacing a currently used computer with a new computer, there is a known method of eliminating the need to install an operating system, this being the method of re-installing the system-resident volume that is installed in the currently used computer into the new computer.

In the case in which the destination computer to which the system-resident volume is currently installed, is to be changed, in the past, the replacement operation was performed with the operator taking into consideration the position (location) of the operating system in the system-resident volume.

That is, if the boot path that is recognized by the destination computer differs from the position of the operating system in the system-resident volume, it will not be possible to boot the operating system at the destination computer.

As a result, if both are different, what is done for example is that the boot path information that indicates the position of the operating system in the system-resident volume is stored in a backup memory of the destination computer, so that there is coincidence between the boot path recognized by the computer and the location of the operating system in the system-resident volume.

In the above-described technology, however, the following problems exist.

The first problem is that of the burden placed on the operator at the time the system-resident volume is exchanged.

The reason for this is that, in the case in which the location of the operating system in the system-resident volume differs from the boot path recognized by the destination computer, it is necessary to store into a backup memory of the computer boot path information corresponding to the actual position of the operating system.

The second problem is that there are cases in which it is not possible to boot the operating system after replacement of the system-resident volume. The reason for this is that, because the boot path information is stored by an operator, there are cases in which erroneous boot path information is stored.

SUMMARY OF THE INVENTION

In view of the above-described drawbacks in the prior art, an object of the present invention is to provide enable the reliable booting of an operating system after replacement of the system-resident volume, without placing a burden on the operator.

To achieve the above-noted object of the present invention provides a computer which enables the replacement of a system-resident volume into which the operating system is installed, the computer comprises;

a backup memory, an installation means which, when an operating system is installed onto a disk that serves as the system-resident volume, writes into the above-noted backup memory and onto the above-noted disk an identifier and booting information of the above-noted operating system, a referencing means which, when the booting of the operating system starts, accesses the above-noted backup memory and the system-resident volume which is installed in the local computer and judges whether or not the identifier of the operating system and booting information are stored in both of the backup memory and the system-resident volume and, if the operating system identifier and booting information are stored within both, judges whether or not these coincide with one another. and a booting means which, in the case in which the above-noted referencing means judges the condition of coincidence, performs booting of the operating system, but which, in the case in which the above-noted referencing means judges non-coincidence and in the case in which the judgment is made that the operating system identifier and booting information is stored only in the system-resident volume, causes the contents of the above-noted backup memory to coincide with the operating system identifier and booting information that is stored in the above-noted system-resident volume, and then boots the operating system.

In the above-noted configuration, when installing an operating system in a given computer A, the installation means stores the identifier and booting information of the operating system (for example, boot path information such as disk numbers and partition numbers) into the backup memory within computer A and into the disk that is to serve as the system-resident volume installed in computer A.

Therefore, in the case in which there is a system-resident volume installed in computer A onto which the operating system has been installed by computer A, because the result from the referencing means will be "coincidence," the booting means will boot the operating system immediately.

In contrast to the above-noted situation, with regard to a new computer B, into which an operating system has not been installed, to eliminate the need for operation of installation, when the system-resident volume installed in computer A is installed in computer B, the following processing is performed.

When first booting an operating system after replacement of the system-resident volume on computer B, because the referencing means will judge that the operating system identifier and booting information are stored in the system-resident volume only, the booting means will first cause the contents of the backup memory to coincide with the identifier and booting information that are stored in the system-resident volume, and will then boot the operating system.

At the second and subsequent operating system bootings at computer B, because the referencing means will judge the condition of coincidence, the booting means will boot the operating system immediately.

In the case, for example, in which a system-resident volume that had been installed in computer A is to be installed in computer C, in which an operating system has already been installed, the following processing is performed.

In this case, let us assume that the identifier and booting information that are stored in the backup memory of computer C differ from the identifier and booting information that are stored in the replaced system-resident volume.

In the case of the first operating system booting after replacing the system-resident volume in the computer C, because the referencing means will judge that the identifier and the booting information of the operating system that are stored in the backup memory are not coincided with the identifier and booting information that are stored in the system-resident volume, the booting means will first cause the contents of the backup memory to coincide with the identifier and booting information in the system-resident volume, and will then boot the operating system.

Upon the second and subsequent bootings of the operating system, because the referencing means will judge the condition of coincidence, the booting means will boot the operating system immediately.

Additionally, in the case in which a system-resident volume onto which an operating system is not installed is mounted erroneously by an operator, in order to notify the operator of this, the present invention has a message notification means which, in the case in which the referencing means judges that the identifier and booting information of the operating system, are not stored in the above-noted system-resident volume, makes notification of this condition to the operator.

In this configuration, in the case in which a judgment is made by the referencing means that the identifier and the booting information of the operating system are not stored in the system-resident volume, the message notification means notifies the operator.

Additionally, in the case in which the identifier and the booting information of the operating system that are stored in the backup memory, differs from those stored in the system-resident volume, in order to enable the operator to indicate whether or not to boot the operating system that is stored in the system-resident volume, the present invention has an inquiry means which, in the case in which the judgment result of the referencing means is noncoincidence inquires of the operator whether or not to boot the operating system and which, if the operates instructs booting of the operating system, outputs a booting instruction, and in the case in which the booting instruction is output from the inquiry means under the condition in which the judgment of noncoincidence is generated by the referencing means, the booting means first causes the contents of the backup memory to coincide with the operating system identifier and booting information that are stored in the system-resident volume, and then boots the operating system.

In this configuration, in the case in which the result from the referencing means is non-coincidence, the inquiry means inquires of the operator whether or not to boot the operating system and, if the response from the operator is to boot the system, it outputs a booting instruction.

By doing this, after the contents of the backup memory are caused to coincide with the identifier and booting information of the operating system that are stored in the system-resident volume, the operating system is booted.

BRIEF DESCRIPTION OF THE DRAWINGS

FIG. 6 is a drawing which shows an example of a message.

FIG. 7 is a drawing which shows an example of an inquiry statement.

DETAILED DESCRIPTION OF THE PREFERRED EMBODIMENTS

Embodiments of present invention are described below, with reference being made to the relevant accompanying drawings.

Figure 1:
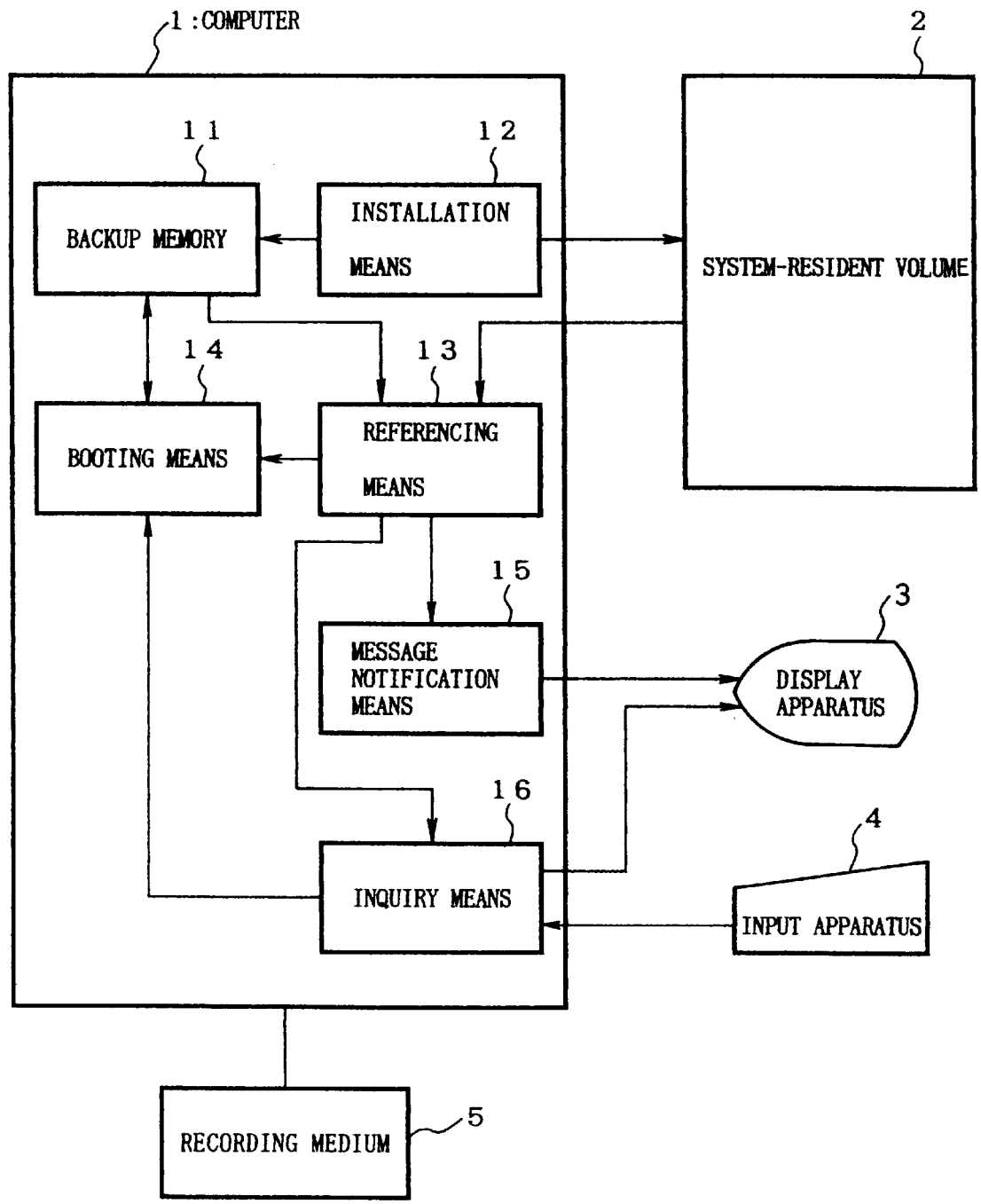
FIG. 1 is a block diagram of an embodiment of the present invention.

FIG. 1 is a block diagram of an embodiment of the present invention, in which the reference numeral 1 denotes a computer, 2 is a system-resident volume mounted on a disk apparatus such as a hard disk drive, 3 is a display apparatus such as a CRT display, 4 is an input apparatus such as a keyboard or mouse, and 5 is a recording medium.

The computer 1 has a backup memory 11, an installation means 12, a referencing means 13, a booting means 14, a message notification means 15, and an inquiry means 16.

Figure 2:
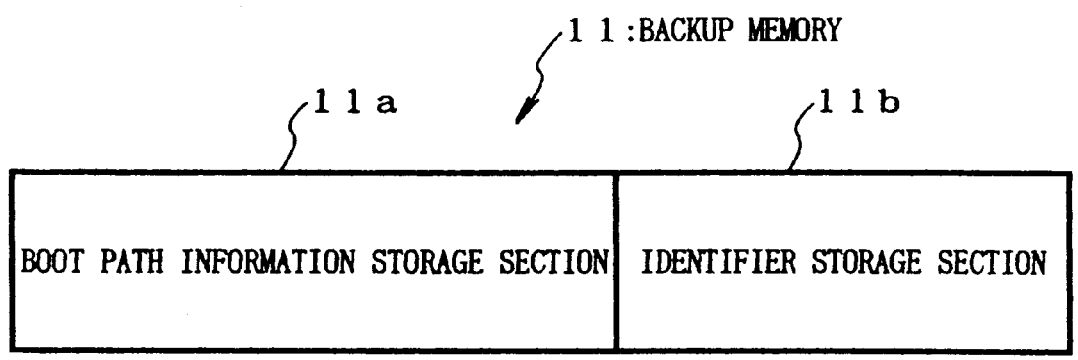
FIG. 2 is a drawing which shows an example of the configuration of the backup memory 11.

The backup memory 11, as shown in FIG. 2, is provided with a boot path information storage section 11a and an identifier storage section 11b.

The installation means 12 has the functions of installing an operating system onto a disk serving as the system-resident volume 2, and of storing the identifier and booting path information of the operating system into the boot path information storage section 11a and identifier storage section 11b of the backup memory 11, respectively, and into the system-resident volume 2.

The referencing means 13 has the functions of judging, when the booting of an operating system is started, whether or not the boot path information and identifier of the operating system are stored in the backup memory 11 and in the system-resident volume 2, and of judging whether or not the boot path information and identifiers stored within each of these locations coincide.

In the case in which the referencing means 13 judges that the boot path information and identifier are not stored in the system-resident volume 2, the message notification means 15 performs the function of displaying a message that notifies an operator of this condition on the display apparatus 3.

In the case in which the referencing means 13 judges that the boot path information and identifiers of the operating system, stored in the system-resident volume 2 and the backup memory 11 do not coincide, the inquiry means 16 performs the function of displaying an inquiry statement on the display apparatus 3 which inquires of the operator whether or not to boot the operating system, and the function of outputting a booting instruction in the case in which the operator' response the above-noted inquiry was to boot the operating system.

The booting means 14 serves the function of booting the operating system, and of causing the contents of the backup memory 11 to coincide with the boot path information and identifier stored in the system-resident volume 2.

The recording medium 5 with which the computer 1 is provided is a disk, semiconductor memory, or other recording medium. This recording medium 5 stores a program for the purpose of having the computer 1 serve as a device for booting the operating system.

This program is read in by the computer 1 and, by controlling the operation of the computer 1, implements the installation means 12, the referencing means 13, the booting means 14, the message notification means 15, and the inquiry means 16 on the computer 1.

The system-resident volume 2 that is mounted on the computer 1 is mountable and removable therefrom, can be removed from computer 1 and mounted onto another computer, and it is possible to replace the system-resident volume 2 with the system-resident volume that has been mounted on another computer.

Figure 3:
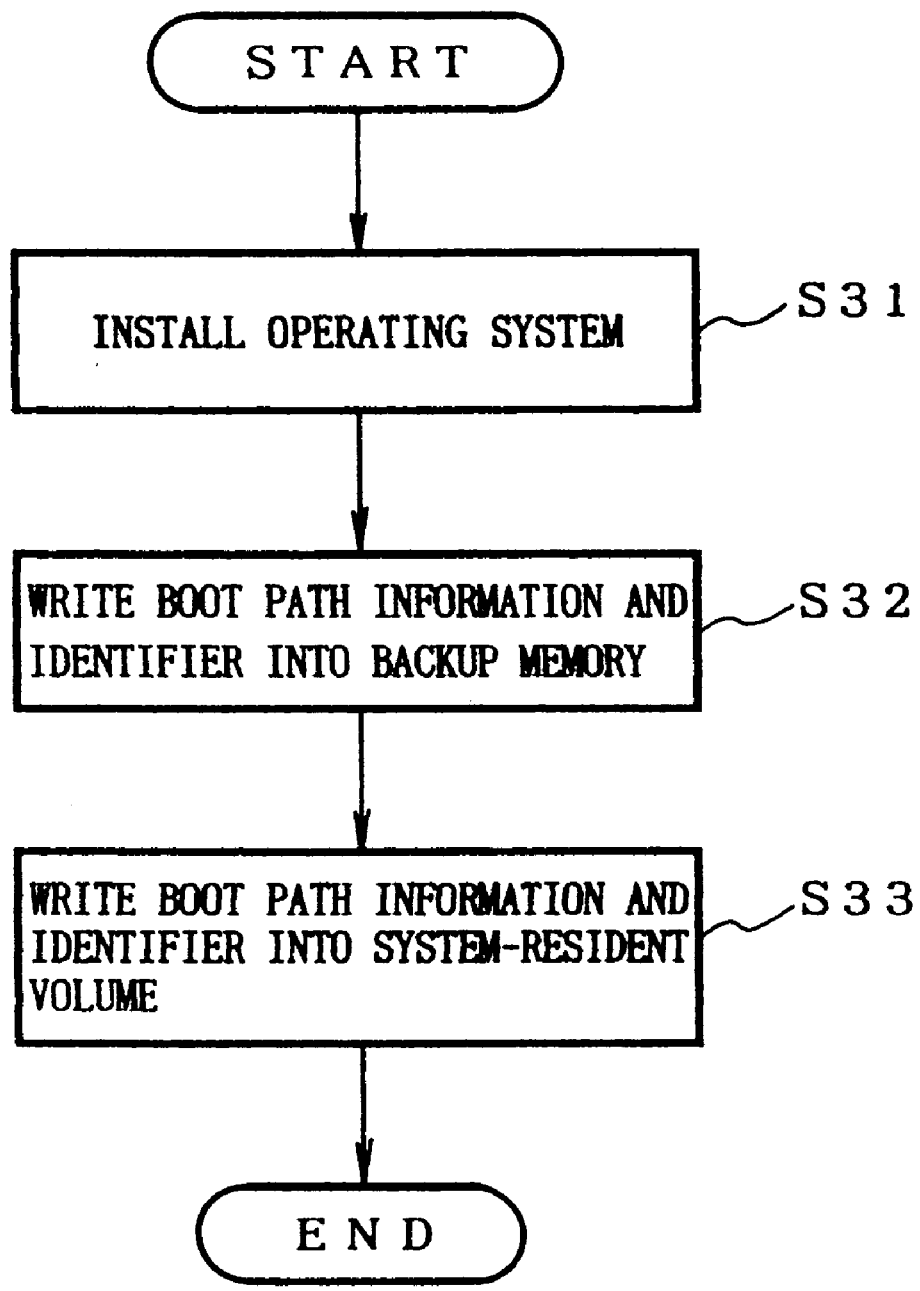
FIG. 3 is a flowchart which shows an example of processing when an operating system is installed.
Figure 4:
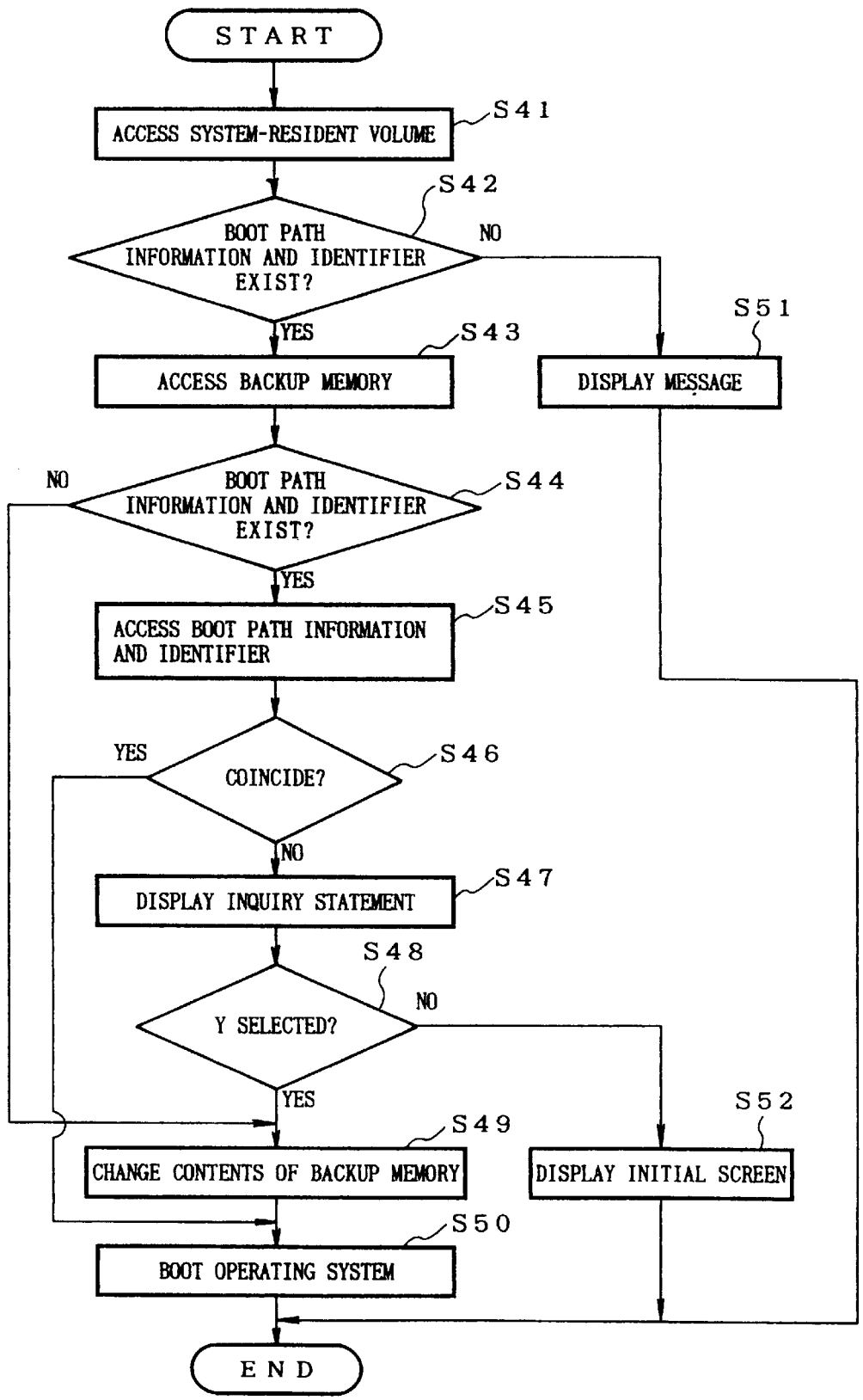
FIG. 4 is a flowchart which shows an example of processing when an operating system is booted.

FIG. 3 is a flowchart that shows an example of the processing performed when an operating system is installed, and FIG. 4 is a flowchart that shows an example of the processing performed when an operating system is booted. The operating of an embodiment of the present invention will be described with reference to these drawings.

First, the operation of installing an operating system will be described.

When installing an operating system, the installation means 12, as shown in the flowchart of FIG. 3, installs the operating system into the system-resident volume 2 (step S31).

Next, the installation means 12 writes the boot path information and the identifier of the installed operating system, into boot path information storage section 11a and identifier storage section 11b of the the backup memory 11, respectively (step S32).

Figure 5:
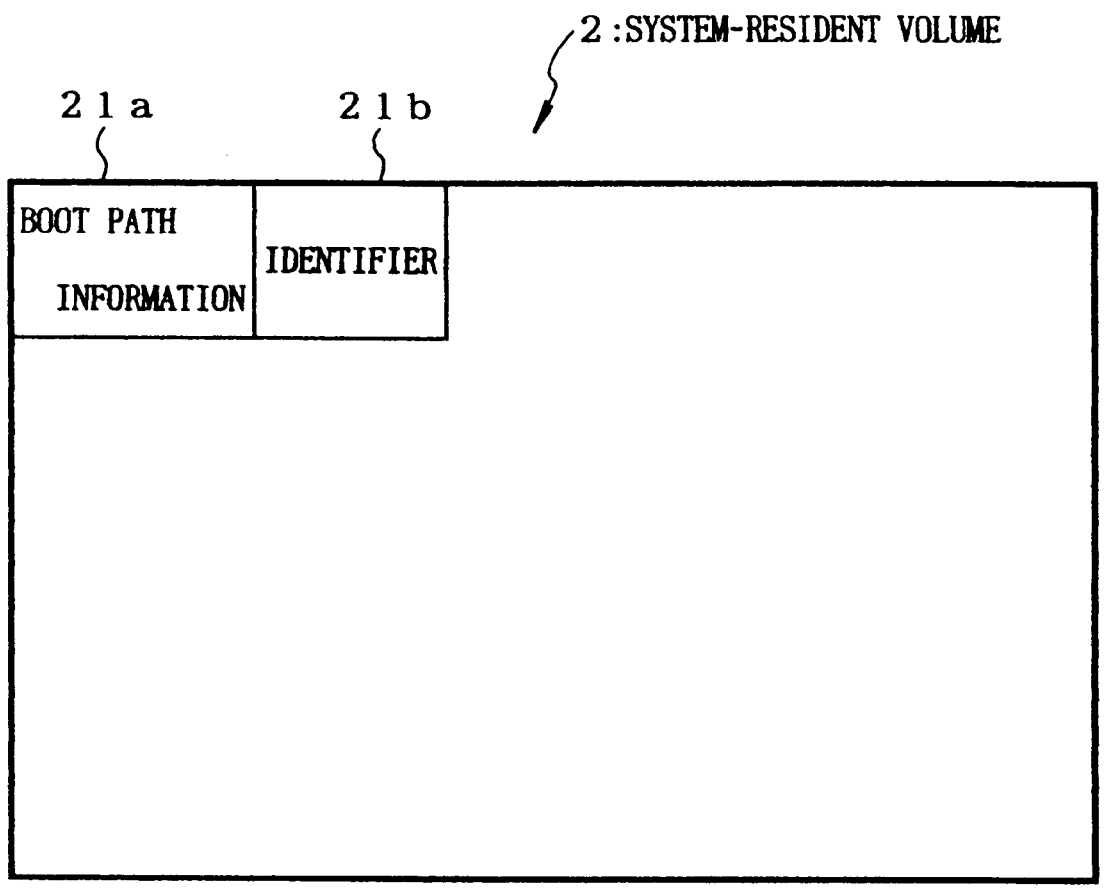
FIG. 5 is a drawing which shows an example of the configuration of a system-resident volume.

Then, the installation means 12, writes the installed operating system boot path information and identifier, into the prescribed parts 21a and 21b of the system-resident volume 2, as shown in FIG. 5 (step S33).

Next, the operation when an operating system is booted will be described.

When the booting of an operating system is started, as shown in the flowchart of FIG. 4, the referencing means 13 access the prescribed parts 21a and 21b of the system-resident volume 2, and makes a judgments as to whether or not the operating system boot path information and identifier are stored therewithin (steps S41 and S42).

Then, in the case in which the judgment was that the above-noted data is not stored (NO at step S42), the message notification means 15 is instructed to display a message (step S51).

By doing this, the message notification means 15, as shown in FIG. 6, causes the display of the message "An operating system is not installed on this disk." on the display apparatus 3.

However, if the judgment result is that the boot path information and identifier are stored in the prescribed parts 21a and 21b of the system-resident volume 2 (YES at step S42), the backup memory 11 is accessed and a judgment is made as to whether or not the boot path information and identifier are stored in the boot path information storage section 11a and identifier storage section 11b (steps S43 and S44).

In the case in which the judgment is made that the boot path information and identifier are not stored in the backup memory 11 (NO at step S44), the referencing means 13 outputs a booting instruction to the booting means 14, and passes the boot path information and identifier that were stored in the prescribed parts 21a and 21b of the system-resident volume 2 to the booting means 14.

By doing this, the booting means 14 writes the boot path information and identifier it was passed from the referencing means 13 into the boot path information storage section 11a and identifier storage section 11b of the backup memory 11, respectively (step S49), after which it boots the operating system (step S50).

At this point, when the booting means 14 writes the identifier into the identifier storage section 11b of the backup memory 11, if for example an asterisk (*) is added to the identifier, by referencing the contents of the identifier storage section 11b, can recognize whether the operating system that is currently in the system-resident volume 2 was installed by the installation means 12 of the local computer or was installed from another computer.

In contrast to the above condition, if a judgment is made that the boot path information and identifier have been stored in the backup memory 11 (YES at step S44), the referencing means 13 accesses the boot path information and identifier that are stored in the system-resident volume 2 and the boot path information and identifier that are stored in the backup memory 11 (step S45).

If the booting means 14 is set up to add an asterisk (*) to the identifier when storing the identifier in the identifier storage section 11b, this asterisk is ignored when accessing the identifier.

In the case in which a judgment is made that the two coincide (YES at step S46), the referencing means 13 outputs a booting instruction to the booting means 14.

By doing this, the booting means 14 boots the operating system (step S50).

If, however, the judgment is made that there is not coincidence between the two (NO at step S46), the referencing means 13 operates the inquiry means 16.

By doing this, the inquiry means 16, as shown in FIG. 7, displays the message "Boot path information and identifier are different. Boot anyway? Y/N" on the display screen of the display apparatus 3 (step S47).

The operator who sees this inquiry decides whether or not to boot the operating system and, selecting Y to boot the operating system or N to not boot the operating system, with utilizing a mouse or the like serving as an input means 4.

In the case in which Y is selected (YES at step 48), the inquiry means 16 outputs a boot instruction to the booting means 14 and passes to the booting means 14 the boot path information and identifier that are stored in the prescribed parts 21a and 21b of the system-resident volume 2, respectively.

By doing this, the booting means 14 writes the boot path information and identifier passed to it from the inquiry means 16 into the backup memory 11, and then boots the operating system (step S50).

If, however, the N is selected (NO at step 48), the initial screen is displayed on the display apparatus 3.

While in the above-described description, the referencing means 13, in the case in which the boot path information and identifiers stored in the backup memory 11 and system-resident volume 2 are judged as not coinciding (FIG. 4, NO at step S46), uses the inquiry means 16 to display an inquiry statement such as shown in FIG. 7, so as to have the operator selected one operation between booting and not booting, it is also possible to do the following.

Specifically, it is possible in the case in which non-coincidence is judged at step S46, a booting instruction is output to the booting means 14 and passes the boot path information and identifier that are stored in the prescribed parts 21a and 21b of the system-resident volume 2 to the booting means 14, so that the booting means 14 is caused to perform processing for changing of the backup memory 11 and for booting the operating system (steps S49 and S50). If this is done, the inquiry means 16 becomes unnecessary.

Next, the operation of this embodiment will be described for a specific example.

Consider the case in which, for example, a system-resident volume 2 that is mounted in computer 1 has an operating system that has been installed into it by the installation means 12 of the computer itself. When booting the operating system, the following processing is performed.

In the above-noted example, because the installation means 12 stores the same boot path information and identifiers into the backup memory 11 and the system-resident volume 2 when the operating system was installed, the results of referencing by the referencing means 13 are "coincidence" (YES at step S46).

As a result, the operating system will be immediately booted by the booting means 14 (step S50).

Next, the operation that is performed to eliminate the need to install an operating system when a new computer is purchased that does not have an operating system installed therein will be described, this being the operation of mounting a system-resident volume $2_\alpha$ (not shown in the drawing), which has an operating system installed and which was mounted on another computer$_\alpha$ (not shown in the drawing) into computer 1.

In this case, the above-noted other computer $_\alpha$a has the same configuration as the computer 1 and, when installing the operating system into the computer $2_\alpha$, the computer $_\alpha$a stores the boot path information and identifier into the prescribed parts of the system-resident volume $2_\alpha$.

In the above-noted example, because the boot path information and identifier are stored in the computer $2_\alpha$ and the boot path information and identifier are not stored in the backup memory within the computer 1, the results of steps S42 and S44 of FIG. 4 are YES and NO, respectively.

As a result, after the boot path information and identifier that were stored in the system-resident volume $2_\alpha$ are stored into the backup memory 11, the operating system is booted (steps S49 and S50).

At the second and subsequent bootings of the operating system, because the result of the referencing means 13 is "coincidence" (YES at step S46), the operating system is booted immediately.

Next, the operation will be described for the case in which, to eliminate the need to install an operating system in a newly purchased computer in which an operating system has not been installed, an attempt is made to mount the system-resident volume $2_\alpha$, which has an operating system installed and which was mounted on another computer $_\alpha$, onto the computer, but in which a disk which does not have an operating system installed on it is erroneously mounted on the computer 1.

In the above-noted example, because the boot path information and identifier are not stored in the system-resident volume mounted on the computer 1, the judgment result at step S42 of FIG. 4 is NO.

As a result, the message notification means 15 causes a message such as shown in FIG. 6 to be displayed on the display screen of the display apparatus 3.

Therefore, by seeing this message, the operator can recognize that an attempt has been made to mount a disk that does not have an operating system installed on it as the system-resident volume in computer 1.

Next, the operation will be described for the case in which, to eliminate the need to install an operating system in a newly purchased computer, into which an operating system has not been installed, in an attempt to use an operating system that is installed in a currently used computer $_\beta$ (not shown in the drawing) in computer 1 as well, the system-resident volume $2_\beta$ (not shown in the drawing) that is mounted in the computer $_\beta$a is mounted in the computer 1.

In this case, the above-noted other computer $_\beta$a has the same configuration as the computer 1 and, when installing the operating system into the computer $2_\beta$, the computer $_\beta$a stores the boot path information and identifier into the prescribed parts of the system-resident volume $2_\beta$.

In the above-noted example, because the boot path information and identifiers stored in the backup memory and the system-resident volume $2_\beta$ differ, so that the result of the judgment at step S46 of FIG. 4 is NO, an inquiry statement such as is shown in Fig. is displayed (step S47).

Then, in the case in which the operator replies to the inquiry with Y, the contents of the backup memory are first changed, after which the operating system is booted (steps S49 and S50).

As mentioned above, the separate embodiment of the present invention is a method for operating startup procedure for a computer and the method is characterized in that the method comprising the steps of;

installing an identifier and booting information of the operating system into a disk serving as a system-resident volume and a backup memory, when installing an operating system into said disk serving as a system-resident volume;

referencing said a system-resident volume which is mounted in the local computer and a backup memory, when the booting of an operating system is started;

performing a judgment as to whether or not said identifier and booting information of said operating system are stored therein;

performing a judgment as to whether or not they coincide, in the case in which they are both stored therein;

booting said operating system, in the case in which the judgment in said referencing means is coincidence; and while booting said operating system, after the contents of said backup memory are coincided with said identifier and booting information of said operating system that are stored in said system-resident volume, in a case in which the judgment in said referencing means is non-coincidence and in a case in which said identifier and booting information of said operating system are stored only in the system-resident volume;

And further separate embodiment of the present invention is a mechanically readable recording media onto which is stored a program that causes a computer that has a backup memory and a system-resident volume onto which is installed and which also enables replacement of said system-resident volume to function, to perform the following process comprising the steps of:

installing an identifier and booting information of the operating system into a disk serving as a system-resident volume and a backup memory, when installing an operating system into said disk serving as a system-resident volume;

referencing said a system-resident volume which is mounted in the local computer and a backup memory, when the booting of an operating system is started;

performing a judgment as to whether or not said identifier and booting information of said operating system are stored therein;

performing a judgment as to whether or not they coincide, in the case in which they are both stored therein;

booting said operating system, in the case in which the judgment in said referencing means is coincidence; and while booting said operating system, after the contents of said backup memory are coincided with said identifier and booting information of said operating system that are stored in said system-resident volume, in a case in which the judgment in said referencing means is non-coincidence and in a case in which said identifier and booting information of said operating system are stored only in the system-resident volume;

The present invention, configured as described in detail above, has the following effects.

The first effect is that it is possible to reduce the burden on the operator when a system-resident volume is replaced and also to reliably boot the operating system.

The reason for this is the provision of an installation means which, when the operating system is booted, in the case in which the operating system boot path information and identifier are not stored in the backup memory of the computer, and the case in which operating system identifier and boot path information that are stored in the backup memory do not coincide with the operating system identifier and boot path information that are stored in the system-resident volume, causes the contents of the backup memory are made to coincide with the operating system boot path information and identifier stored in the system-resident volume, and then boots the operating system.

The second effect is that, in the case in which an operator error results in the mounting of a system-resident volume onto which an operating system has not been installed, the operator can be made aware of this fact.

The reason for this is the provision of a message notification means which, in the case in which the referencing means makes a judgment that the operating system identifier and boot path information are not stored in the system-resident volume, notifies the operator of that condition.

The third effect is that, in the case in which the operating system identifiers and boot path information that are stored in the backup memory and system-resident volume do not agree, the operator can issue an instruction to either boot or not boot the operating system contained in the system-resident volume. The reason for this is the provision of an inquiry means that, in the case in which the referencing means judges the condition of non-coincidence, inquires of the operator whether or not to boot the operating system.

What is claimed is:

1. In a computer which enables replacement of a system-resident volume into which an operating system is installed, an operating system booting apparatus comprising:

a backup memory;

an installation device which, when an operating system is installed onto a disk that serves as a system-resident volume, writes into said backup memory and onto said disk an identifier of said operating system and booting information of said operating system;

a referencing device which, when booting of said operating system starts, accesses said backup memory and said system-resident volume which is installed in the computer and judges whether or not said identifier of said operating system and said booting information are stored in both of said backup memory and said system-resident volume and, if said operating system identifier and said booting information are stored within both, judges whether or not these coincide with one another; and a booting device which, in the case in which said referencing device judges a condition of coincidence, performs booting of said operating system, but which, in the case in which said referencing device judges non-coincidence and in the case in which a judgment is made that said operating system identifier and booting information is stored only in the system-resident volume, causes the contents of said backup memory to coincide with the operating system identifier and booting information that is stored in said system-resident volume, and then boots said operating system.

2. An operating system booting apparatus according to claim 1, further comprising a message notification device which, in a case in which said referencing device judges that said operating system identifier and booting information are not stored in said system-resident volume, notifies an operator of said condition.

3. An operating system booting apparatus according to claim 2, further comprising an inquiry device which, in a case in which said referencing device judges non-coincidence, makes inquiry to said operator of whether or not said operating system is to be booted, and which, if said operator indicates that said operating system is to be booted, outputs an instruction to boot, and wherein in a case in which a booting instruction is output from the inquiry device an said referencing device judges non-coincidences, said booting device first causes the contents of said backup memory to coincide with said operating system identifier and booting information that are stored in said system-resident volume, and then boots said operating system.

4. An operating system booting apparatus according to claim 1, wherein said booting information is boot path information which includes a number of a disk and number of a partition onto which said operating system is installed.

5. A method for operating system startup in computer which has a backup memory and a system-resident volume onto which an operating system is installed and which also enables replacement of said system-resident volume, said method comprising the steps of;

installing an identifier and booting information of the operating system into a disk serving as a system-resident volume and a backup memory, when installing an operating system into said disk serving as a system-resident volume;

referencing said a system-resident volume which is mounted in the computer and a backup memory, when the booting of an operating system is started;

performing a judgment as to whether or not said identifier and booting information of said operating system are stored therein;

performing a judgment as to whether or not they coincide, in the case in which they are both stored therein;

booting said operating system, in the case in which the judgment is coincidence; and in a case in which the judgment is non-coincidence and in a case in which said identifier and booting information of said operating system are stored only in the system-resident volume, causing the contents of the backup memory to coincide with the operating system identifier booting information that is stored in said system-resident volume, and then booting said operating system.

6. A mechanically readable recording media onto which is stored a program that causes a computer that has a backup memory and a system-resident volume installed therein and which also enables replacement of said system-resident volume to function, to perform the following process comprising the steps of:

installing an identifier and booting information of the operating system into a disk serving as a system-resident volume and a backup memory, when installing an operating system into said disk serving as a system-resident volume;

referencing said a system-resident volume which is mounted in the computer and a backup memory, when the booting of an operating system is started;

performing a judgment as to whether or not said identifier and booting information of said operating system are stored therein;

performing a judgment as to whether or not they coincide, in the case in which they are both stored therein;

booting said operating system, in the case in which the judgment in said referencing means is coincidence; and in a case in which the judgment is non-coincidence and in a case in which said identifier and booting information of said operating system are stored only in the system-resident volume, causing the contents of the backup memory to coincide with the operating system identifier booting information that is stored in said system-resident volume, and then booting said operating system.

* * * * *